United States Patent [19]

Yoshida et al.

[11] Patent Number: 4,721,773

[45] Date of Patent: Jan. 26, 1988

[54] PROCESS FOR PRODUCING GRANULAR VINYL CHLORIDE POLYMER

[75] Inventors: Hiroshi Yoshida, Takaoka; Shiro Imaizumi, Yokohama; Masaaki Nishina, Takaoka, all of Japan

[73] Assignee: Nippon Zeon Co., Ltd., Tokyo, Japan

[21] Appl. No.: 27,119

[22] Filed: Mar. 16, 1987

Related U.S. Application Data

[63] Continuation of Ser. No. 676,877, Nov. 30, 1984, abandoned.

[30] Foreign Application Priority Data

Dec. 2, 1983 [JP] Japan .................. 58-228075

[51] Int. Cl.$^4$ .................................. C08F 6/24
[52] U.S. Cl. .................. 528/491; 528/502; 528/503; 523/330; 524/297; 524/569; 34/10
[58] Field of Search .......... 528/491, 502, 503; 523/330; 524/297, 569; 34/10

[56] References Cited

U.S. PATENT DOCUMENTS 3,772,252 11/1973 Blunt .................................. 528/491
4,389,522 6/1983 Boeke et al. ...................... 528/503
4,604,454 8/1986 Nishina et al. .................... 528/491

FOREIGN PATENT DOCUMENTS 0209905 12/1982 Japan .................................. 528/491

OTHER PUBLICATIONS

Nakamura (Translation of Jap. Kokai Pat. Appl. Pub. No. Sho 57[1982]-209905).
"Chem. Eng. Hndbk", J. Perry (ed.), McGraw-Hill Inc., N.Y. (1950) pp. 800-807.

*Primary Examiner*—Joseph L. Schofer
*Assistant Examiner*—F. M. Teskin
*Attorney, Agent, or Firm*—Sherman and Shalloway

[57] ABSTRACT

A granular vinyl chloride polymer is produced by mixing an aqueous dispersion of a vinyl chloride polymer with an organic liquid being difficulty soluble in water and incapable of dissolving or swelling the vinyl chloride polymer to prepare an aggregate of particles of the vinyl chloride polymer, dehydrating the aggregate and then drying it. The drying is carried out by using a fluidized drying machine under such conditions that the temperature of the vinyl chloride polymer is not more than 40° C. in the constant rate period of drying and not more than 50° C. in the falling rate period of drying.

6 Claims, No Drawings

PROCESS FOR PRODUCING GRANULAR VINYL CHLORIDE POLYMER

This application is a continuation, of application Ser. No. 676,877 filed Nov. 30, 1984 abandoned.

This invention relates to a process for producing a granular vinyl chloride polymer (to be referred to as PVC) suitable for paste molding.

In paste molding, it is the usual practice to mix PVC produced for paste molding with a plasticizer and a stabilizer and as required, compounding agents such as a pigment or a filler to form a liquid plastisol or organosol, and submit the sol to a molding step. A molded article is obtained by molding the liquid sol by such means as casting, coating or dipping, melting the molded product under heat and solidifying it. The flowability of the sol is the most important characteristic of the plastisol or organosol in paste molding, and the dispersiblity of PVC in liquid compounding agents is also cited as an important characteristic. The presence of coarse and firm aggregated masses of PVC powder in the sol will not only adversely affect the flowability of the sol, but also cause troubles during the coating process such as streaking and produce deleterious effects on the quality of the final product such as surface roughening, loss of gloss and reduced strength and on operability such as blocking during the transportion of the sol.

A paste-molding PVC is produced usually by polymerizing vinyl chloride or a monomeric mixture composed mainly of vinyl chloride in emulsion or suspension in the presence of a radical-generating polymerization initiator and an emulsifier to form an aqueous dispersion of spherical resin particles having a size of 0.05 to 5 microns, spray-drying the aqueous dispersion, and pulverizing the resulting powder.

Since the resulting resin is a fine powder, it scatters during bagging or when it is taken out from the bag and mixed during sol preparation. This worsens the working environment. Moreover, since the flowability of the powder is poor, it is difficult to rationalize powder handling as in automatic measurement and automatic transportation.

As stated above, paste-molding PVC has the essential problem that in order to meet the requirements for paste molding, it cannot but have a shape which makes its powder properties poor.

Various attempts have therefore been made to solve the problems of handling or scattering by converting fine particles into granules by properly aggregating them. For example, Japanese Laid-Open patent publication Nos. 49630/1982, 55948/1982 and 209905/1982 disclose that PVC granules having good powder properties are obtained by mixing an aqueous dispersion of PVC with an organic liquid such as a paraffinic hydrocarbon, naphthenic hydrocarbon, aromatic hydrocarbon, a chlorinated hydrocarbon or a plasticizer to cause transfer of PVC into the organic liquid phase, dehydrating the liquid phase and drying PVC captured by the organic liquid phase. It is stated that in these methods, the temperature of the material to be dried in the drying step should be adjusted finally to not more than 50° C. in order for these granules to maintain good dispersibility in the sol. For this purpose, it is also desired to adjust the temperature of the heat medium in the dryer to not more than 50° C. Evidently, however, drying with a medium kept at such a low temperature is disadvantageous in respect of the size of the apparatus and the drying efficiency.

It is an object of this invention therefore to produce PVC granules having good dispersibility by efficiently drying a wet cake of paste-molding PVC granules obained by each of the aforesaid known methods.

According to this invention, the above object is achieved by a process for producing a granular vinyl chloride polymer, which comprises mixing an aqueous dispersion of a vinyl chloride polymer with an organic liquid being difficultly soluble in water and incapable of dissolving or swelling the vinyl chloride polymer to prepare an aggregate of particles of the vinyl chloride polymer, dehydrating the aggregate and then drying it, said drying being carried out by using a fluidized drying machine under such conditions that the temperature of the vinyl chloride polymer is not more than 40° C. in the constant rate period of drying and not more than 50° C. in the falling rate period of drying.

The aqueous dispersion of PVC used in this invention is an aqueous dispersion of a homopolymer of vinyl chloride, or an aqueous dispersion of a copolymer of a major amount (usually at least 70% by weight) of vinyl chloride and a minor amount of an olefinic monomer such as vinyl acetate, vinylidene chloride, ethylene, propylene, butene, acrylonitrile, acrylic esters, methacrylic esters or maleic acid, and is not particularly restricted if it can be used in ordinary processings. As required, it may contain an extender vinyl chloride resin. The content of PVC in the aqueous dispersion is 10 to 70% by weight. Hence, the aqueous dipsersion of PVC as obtained by polymerization may conveniently be used directly. As required, the aqueous dispersion may be partially dehydrated or admixed with a required amount of water. When the PVC content of the aqueous dispersion is less than 10% by weight, the amount of the waste liquor becomes too large as compared with the amount of the product, and this is economically disadvantageous. If it exceeds 70% by weight, the viscosity of the mixture of the aqueous dispersion and the organic liquid rises markedly, and therefore, the operation becomes difficult.

The organic liquid to be added to the aqueous dispersion of PVC is difficultly soluble in water and does not dissolve or swell PVC at a temperature of 20° to 70° C. Generally, the organic liquid has a melting point of not more than 20° C. and a boiling point under atmospheric pressure of at least 70° C., preferably at least 200° C.

The reason for the requirement that the organic liquid should be difficultly soluble in water is twofold. Firstly, it is for the purpose of decreasing the amount of the organic liquid to be carried on the aqueous phase to be separated after it is mixed with the aqueous dispersion of PVC, thereby preventing a loss of the organic liquid and reducing the trouble of the waste liquor treatment. Secondly, in order to aggregate the PVC particles dispersed in water through the organic liquid, the organic liquid should be present between the PVC particles and water as a liquid phase having an interface. The organic liquid is also required to be incapable of dissolving or swelling PVC. Otherwise, the PVC particles would be deformed or degenerated. Furthermore, since most of the organic liquid used in this invention remains in the final resin product, those organic liquids which adversely affect the processability of the final resin and the quality of the molded articles therefrom should be avoided. It is most rational to use liquid compounding agents used in ordinary processings as the organic liquid.

Examples of the organic liquid that can be used in this invention are given below.

(1) Alkyl phthalate-type plasticizers such as dioctyl phthalate, dinonyl phthalate, butyllauryl phthalate and methyloleyl phthalate.

(2) Aromatic carboxylic ester-type plasticizers such as trioctyl trimellitate and diethylene glycol dibenzoate.

(3) Aliphatic dibasic acid ester plasticizers such as dioctyl adipate, dibutyl sebacate and dioctyl tetrahydrophthalate.

(4) Phosphoric ester-type plasticizers such as trioctyl phosphate and trichloroethyl phosphate.

(5) Fatty acid glycol ester-type plasticizers such as diethylene glycol dicaprylate and 1,4-butylene glycol di-2-ethylhexanoate.

(6) Polyester-type plasticizers.

(7) Fatty acid ester-type secondary plasticizers such as butyl oleate, methyl acetylricinolate and 2,2,4-trimethyl-1,3-pentanediol diiosobutyrate.

(8) Epoxy-type secondary plasticizers such as epoxidized soybean oil and octyl epoxystearate.

(9) Chlorinated paraffin-type secondary plasticizers such as chlorinated fatty acid methyl esters.

(10) Aliphatic dibasic acid ester-type secondary plasticizers such as dioctyl succinate.

(11) Petroleum-type diluents such as mineral spirit and mineral terpene.

(12) Long-chain alkylbenzene-type diluents such as dodecylbenzene.

(13) Liquid lubricants such as higher alcohols, liquid paraffin and higher fatty acid alkyl esters.

The amount of the organic acid used is usually 0.5 to 30 parts by weight, preferably 1 to 15 parts by weight, per 100 parts by weight of PVC in the aqueous dispersion. If it is less than 0.5 part by weight, the PVC particles cannot be fully aggregated through the organic liquid. If it exceeds 30 parts by weight, a sol-like aggregate is liable to form. Even if a granular aggregate is formed, its high organic liquid content makes it difficult to remove the remaining liquid in the subsequent step of drying and may lead to a reduction in productivity.

For the mixing step, mixing devices which meet a predetermined set of conditions may be selected. Generally, there can be used, for example, a high-speed rotating continuous mixer, a multivane-type continuous mixing tank, a batchwise stirred tank-type mixer, a vessel rotating-type mixer, a liquid division-type stationary mixer, etc. Mixing by ultrasonication is also possible.

The mixing of the aqueous PVC dispersion with the oragnic liquid is carried out at a temperature of 20° to 70° C. Since, however, the speed of swelling PVC with the organic liquid increases as the temperature rises, it should be preferably carried out at a temperature of not more than 50° C. If the temperature exceeds 70° C., the absorption of the organic liquid by PVC is accelerated and moreover, PVC is softened and coalesced so that the final product may no longer be adaptable to processing. The aggregate of PVC formed through the organic liquid is dehydrated by a known method according to its shape. To prevent softening and coalescing of PVC, the temperature should be 20° to 70° C.

The PVC particles separated by the dehydrating step are then submitted to a drying step involving the constant rate period of drying at a temperature of not more than 40° C. and the falling rate period of drying at a temperature of not more than 50° C.

The constant rate period of drying means the period in which drying proceeds at a constant speed while the surface of the PVC particles is covered with a water film. During this period, water adhering to the surface of the PVC particles evaporates, and therefore, the temperature of PVC is determined by the wet-bulb temperature of the air at the inlet. For example, when dry air having an absolute humidity of 0.01 kg $H_2O$/kg is used, the temperature of the air at the inlet which corresponds to a wet-bulb temperature of 40 °C. is about 130° C. Accordingly, in this case, the temperature of PVC is set at not more than 40° C. if the temperature of the air at the inlet is adjusted to 130° C. or less. If the temperature of PVC in the constant rate period of drying exceeds 40° C., sufficient sol dispersibility cannot be secured. The lower limit of the temperature of the air at the inlet is not particularly restricted technically or from the standpoint of the quality of the final product. In view, however, of the purport of this invention, it is desirably at least 60° C.

The falling rate period of drying means the period in which the speed of drying decreases as the moisture content decreases. During this period, the speed of supplying diffused water from the inside to the surface of the PVC particles becomes lower than the speed of water evaporation on the surface, and a dried portion begins to form on the surface. As a result, the temperature of PVC rises with an increase in moisture content, and approaches the temperature of the air at the inlet. In the present invention, the temperature of PVC in this period should be adjusted to not more than 50° C. If the temperature of PVC exceeds this limit, sufficient sol dispersibility cannot be secured.

The moisture content at a time when the constant rate period of drying changes to the falling rate period of drying is called the critical moisture content.

Since the PVC particles to be dried have a particle size in the range of several tens of microns to several hundred microns, especially 50 to 500 microns, a fluidized drying machine is used to dry them. The drying step by the fluidzed drying machine is divided into a first stage and a second stage. In the first stage, drying at a constant rate is effected, and in the second stage, drying at a falling rate is carried out. PVC having a critical moisture content of about 3% (wet base) may be dried to a moisture content of 3% in the first stage when an ideal fluidized drying machine with little distribution of the residence time is used. Actually, however, there is a distribution of the residence time, and unevenness in fluidization and adhesion to the wall surface can occur. In view of this, the first stage drying is preferably stopped when the moisture content is slightly larger than the critical moisture content, for example 5 to 7%. In the second stage, the drying is carried out to a moisture content of not more than 1%.

In addition to the drying conditions, the superficial velocity in an empty column (i.e. velocity of drying air in an empty fluidized bed drying machine) may be cited as a factor which determines the size of the fluidized drying machine. As the superficial velocity is larger, the coefficient of heat capacity becomes higher and the size of the apparatus becomes smaller. If, however, the superficial velocity is too large, the granules will be destroyed and abraded to develop a fine powder and cause undesirable phenomena such as worsening of powder properties and blockage of a recovery cyclone. It is desirable therefore to select the optimum superficial velocity. The preferred superficial velocity in an empty column is 0.5 to 1.0 m/sec in the first stage and 0.2 to 0.6 m/sec in the second stage. In the first stage where water adhering to the surface exists, a fine powder does not easily occur and the superficial velocity can be high. But in the second stage, the surface is dry and a fine powder is liable to occur. It is desirable therefore to make the superfical velocity lower than in the first stage. For example, the size of the apparatus when the temperature of the inlet air is 100° C. and the superficial velocity is 0.8 m/sec in the first stage and the temperature of the inlet air is 50° C. and the superficial velocity is 0.4 m/sec in the second stage is about ⅔ of that of the apparatus when the superficial velocity is the same and the temperature of the inlet air is 50° C. both in the first and second stages, showing a marked reduction.

The fluidized layer drying machine used in this invention may be of the types generally used. The inclusion of a hot water tube within the dryer is effective for reducing the size of the apparatus. Fluidization may be made complete by providing a stirrer rotating at a low speed on a dispersion plate on which the wet cake is to be placed. A porous plate, a multilayer wire gauze plate, canvas, a jet nozzle, etc. may be used as the dispersion plate.

The drying step consisting of the constant rate period and the falling rate period may also be applied to dryers other than the fluidized drying machine, such as an aeration drying machine, an air current drying machine or a heat transfer-type drying machine, but not without problems. In the case of the areation drying machine, especially a band-type aeration drying machine, the residence time distribution is uniform and the degree of powderization is small. But since it has a lower coefficient of heat capacity than the fluidized drying machine, the scale of the apparatus becomes larger. When the air current drying machine is applied to drying in the constant rate period, powderization occurs vigorously during the drying and the powder properties are degraded because the speed of air current is as high as more than 20 m/sec. A groove-type stirred drying machine, a kind of the heat transfer-type drying machine, is undesirable because it involves powderization and destruction of the granules by stirring. A vacuum drying machine and a freeze drying machine are disadvantageous in regard to the scale of the apparatus or the operating efficiency.

According to the process of this invention, dry PVC particles can be obtaind efficiently. These particles have good flowability and scatter little. In addition, the viscosity of a plastisol formed therefrom in a customary manner or the properties, such as heat stability, of a molded article therefrom are equivalent to those of ordinary paste-molding PVC.

The following Example illustrate the present invention specifically.

EXAMPLE

A 12-liter tank-type mixing device was charged with 11,000 g of an aqueous dispersion of a paste-molding vinyl chloride resin (solids content 30% by weight), and with vigorous stirring, 300 g of di-2-ethylhexyl phthlate was introduced into it over the course of 10 minutes. After the introduction, the mixture was further stirred for 15 minutes to give a slurry-like dispersion. Fine particles were removed from the dispersion by means of a 80-mesh wire gauze. The granules on the wire gauze were centrifugally dehydrated to give 4,000 g of wet granules (moisture content 30% wet base). One thousand grams of the wet granules were put in a cylindrical fluidized drying machine having an inside diameter of 200 mm and equipped with a stirrer, and dried with stirring. The drying step was divided into a constant rate period and a falling rate period with a specific moisture content used as a boundary. The critical moisture content of this granular resin measured in advance was 3% (wet base).

The powder properties (the angle of repose and bulk density) and the sol dispersibility (north fineness) of the resulting dry granules were evaluated.

The angle of repose is a measure of the ease of flowing of the powder. The smaller this value, the better the flowability.

The bulk density is the apparent density of the powder. The larger the value, the better its handlability.

The north fineness value was determined as follows:- 100 g of the granules and 60 g of di-2-ethylhexyl phthalate were mixed for 10 minutes by an Ishikawa-type grinding and mixing machine (#18). The maximum aggregated particle diameter in the resulting sol was measured by a grind meter, and the result was expressed by a numeral ranging from 0 to 8. 8 means the finest, and 0 means the most rough.

The drying conditions and the north fineness values of the resulting granules are shown in the following table. The temperature of PVC was that of PVC in the fluidized layer. The dry air used had an absolute humidity of 0.01 kg $H_2O$/kg.

When the temperature of PVC in the constant rate period of drying exceeded 40° C. (Run No. 4) and the temperature of PVC in the falling rate period of drying exceeded 50° C. (Run No. 5), the powder properties of the dried granules were equivalent, but the granules had a large degree of aggregation and very inferior sol dispersibility, as compared with the examples of the invention (Runs Nos. 1 to 3).

| Run No. | Drying conditions in the constant rate period | | | | Drying conditions in the falling rate period | | | | Angle of repose | Bulk density | North fineness value |
| --- | --- | --- | --- | --- | --- | --- | --- | --- | --- | --- | --- |
| | Superficial velocity in an empty column (m/sec) | Temperature of the inlet air (°C.) | Temperature of PVC (°C.) | Moisture content (%, wet base) | Superficial velocity in an empty column (m/sec) | Temperature of the inlet air (°C.) | Temperature of PVC (°C.) | Moisture content (%, wet base) | | | |
| 1 | 0.8 | 50 | 25 | 3.2 | 0.4 | 50 | 45 | 0.74 | 41.5 | 0.60 | 5.5 |
| 2 | 0.8 | 65 | 29 | 4.1 | 0.4 | 40 | 39 | 0.72 | 41 | 0.57 | 4.5 |
| 3 | 0.8 | 100 | 37 | 4.0 | 0.4 | 45 | 44 | 0.69 | 39 | 0.58 | 5.0 |
| 4 (Comparison) | 0.8 | 140 | 41 | 7.8 | 0.4 | 45 | 42 | 0.80 | 38 | 0.60 | 0 |
| 5 (Comparison) | 0.8 | 60 | 27 | 3.5 | 0.4 | 60 | 54 | 0.61 | 41 | 0.58 | 0 |

What is claimed is:

1. A process for producing a granular vinyl chloride polymer, which comprises mixing, at a temperature of 20° to 70° C., an aqueous dispersion of a vinyl chloride polymer with an organic liquid being difficultly soluble in water and incapable of dissolving or swelling the vinyl chloride polymer to prepare an aggregate of particles of the vinyl chloride polymer, dehydrating the aggregate and then drying it, said drying being carried out by using a fluidized drying machine under such conditions that the temperature of the vinyl chloride polymer is not more than 40° C. in the constant rate period of drying and not more than 50° C. in the falling rate period of drying, the superficial velocity of the drying air in an empty fluidized drying machine in the falling rate period of drying being lower than that in the constant rate period of drying, and the drying in said constant rate period is carried out until the moisture content of the vinyl chloride polymer reaches 3-7% and the drying in said falling rate period is carried out until the moisture content of the vinyl chloride polymer reaches not more than 1%.

2. The process of claim 1 wherein the superficial velocity of the drying air in an empty fluidized drying machine in the constant rate period of drying is 0.5 to 1.0 m/sec.

3. The process of claim 1 wherein the superficial velocity of the drying air in an empty fluidized drying machine is 0.2 to 0.6 m/sec. in the falling rate period of drying.

4. The process of claim 1 wherein the drying in the constant rate period is carried out until the moisture content of the vinyl chloride polymer reaches 5 to 7%.

5. The process of claim 1 wherein the amount of the organic liquid used is 0.5 to 30 parts by weight per 100 parts by weight of the vinyl chloride polymer in the aqueous dispersion.

6. The process of claim 1 wherein the organic liquid is an alkyl phthalate-type plasticizer.

* * * * *